Feb. 6, 1934.  A. T. MOSBERG  1,946,230

AUTOMOBILE RADIATOR REFLECTOR CAP

Filed Sept. 6, 1930

INVENTOR
Arnold T. Mosberg
BY
Milburn and Milburn
ATTORNEYS

Patented Feb. 6, 1934

1,946,230

UNITED STATES PATENT OFFICE 1,946,230

AUTOMOBILE RADIATOR REFLECTOR CAP

Arnold T. Mosberg, Lakewood, Ohio

Application September 6, 1930. Serial No. 480,141

3 Claims. (Cl. 88—1)

This invention relates to an automobile vision attachment which will aid the driver to obtain an image of another automobile coming along a side street which he is about to cross.

The object is to provide such a device which is comparatively simple in construction and which is also applied to the automobile in a simple manner.

Figure 1:
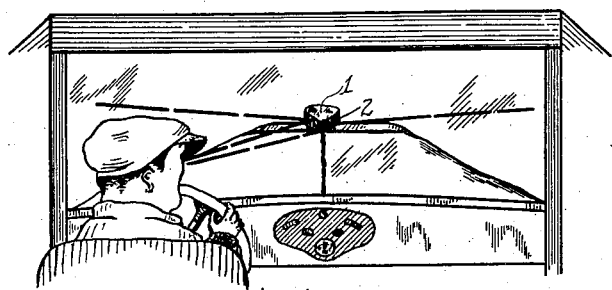
Figure 2:
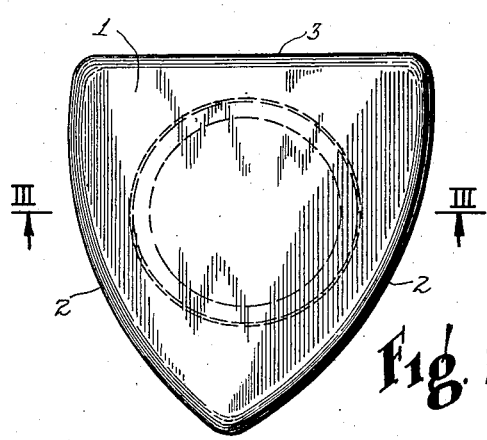
Figure 3:
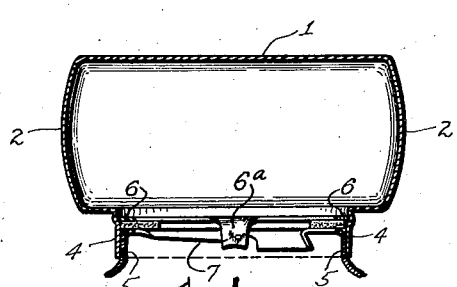

Fig. 1 illustrates the location and function of my present device; Fig. 2 is a plan view; and Fig. 3 is a vertical sectional view thereof.

In the present case, the device is adapted to be positioned directly over the radiator nozzle of an automobile, and is to be attached to either the radiator cap or the nozzle. There may be devised various ways of attaching this device, and the form of the device itself might be modified, all without departing from the spirit of the present invention as herein set forth. The present form of disclosure is therefore merely for purposes of illustration and all modifications are intended to be comprehended by the present invention as herein claimed.

The vision attachment, according to the present invention, can be constructed by stamping the same out of sheet metal, as for instance, monometal or rustless steel which will serve to produce the reflecting surface portions when formed in the manner herein set forth.

The main body of this device has the top (1), sides (2) and front (3). This device is of hollow form, since it is formed from one piece of sheet metal, and may be given any suitable or desirable shape, so long as the sides (2) are of sphero-convex form and are inclined rearwardly towards each other for the purpose of reflecting to the eye of the driver the image of an object approaching from a side street. Its lower side has the depending centrally disposed annular flange (4) which surrounds the radiator nozzle (5). In the present illustration, the disk (6) is held in the annular groove provided in the flange (4) and has the depending integral fingers 6ª which have locking engagement with the cam shoulders (7) provided upon the inside of the nozzle (5). The intersection of the sides (2) is slightly to the left of the longitudinal axis of the automobile, because of the location of the driver's seat upon the left side. Thus the left side (2) as viewed from the inside of the automobile, is slightly shorter than the right side. In this way the viewing of the reflected images by the driver will be facilitated.

Assuming that the driver comes to a cross street and is prevented from obtaining a direct view of such cross street before the front end of his automobile actually begins to make such crossing. Taking into consideration the distance of the extreme front end of an automobile from the position of the driver, especially in the case of an especially long engine hood, the front end of the automobile will in some cases begin to cross at the street intersection before the driver himself can obtain a direct view of any other automobiles which might be approaching from the side street. In any event, it is extremely desirous for the driver to obtain as soon as possible any information as to such other automobile; and with the present device, the driver, by observing its two sides, can obtain such advance information as to the condition of traffic which might be approaching from either the right or left side. Thus he is saved the annoyance of endeavoring to obtain a direct view of the side street both to the right and left, which would require turning of the head, except for the provision of the present improved form of device. With the convex reflecting surfaces each arranged at substantially forty-five degrees to the line from the radiator nozzle to the eyes of the driver, he is afforded a comparatively wide range of vision of the side streets, and this particular form of reflecting surface will present a well-defined image of any object approaching from the side. Thus he is warned of possible danger and he obtains such information sufficiently in advance to enable him to avert what might otherwise result in an accident.

The present device is especially useful upon that type of automobile in which for instance the hood of the engine is especially long because of the increased number of cylinders arranged in a single straight line.

My present form of device will serve also as a radiator cap and may therefore be said to perform a double function. The top part of this device may also be formed into a decorative display as an integral part thereof. Thus the present device constitutes a decided advance in the art, since, so far as known, the prior devices of this nature involved unsightly and more or less complicated and expensive mechanism in the devices themselves as well as the means for attaching the same to the automobile.

Thus, the present form of device is efficient for the purpose intended, it is ornamental and it can be manufactured at a comparatively low price and sold directly to the user for application to the various forms of automobiles. So far as necessary, these devices can be manufactured with replaceable means of attachment to the radiator cap or nozzle, according to the various forms of nozzles and caps found upon the different kinds of automobiles; and in this way, the present device will be capable of universal application.

What I claim is:

1. A reflector device for automobiles, comprising a one-piece body portion, reflector portions formed integrally with said body portion and located at approximately ninety degrees to each other upon oppostie sides of said body portion so as to reflect an image of an object approaching from either side of the path of travel of the automobile, and means for disposing said body portion itself concentrically with respect to the radiator nozzle of the automobile.

2. A reflector device for automobiles, comprising a one-piece body portion, said body portion having a closed top and an open bottom and having integrally formed convex reflector portions located at approximately ninety degrees to each other upon opposite sides of said body portion so as to reflect an image of an object approaching from either side of the path of travel of the automobile, and means for disposing said body portion itself concentrically with respect to the automobile radiator nozzle so as to serve as a radiator cap as well as a viewing device.

3. A reflector device for automobiles, comprising a one-piece sheet metal body portion having an integrally formed closed top and open bottom and integrally formed sphero-convex side portions arranged at approximately forty-five degrees to the line of view of the driver towards the present device, and intersecting at a point to the one side of the longitudinal axis of the automobile, according to the side upon which the driver's seat is located, said parts being so constructed and arranged that the image of an approaching object from either side of the path of travel of the automobile will be reflected to the eyes of the driver, and means for detachably disposing said body portion itsef concentrically with respect to the radiator nozzle of the automobile.

ARNOLD T. MOSBERG.